United States Patent [19]

Himuro

[11] Patent Number: 5,421,391
[45] Date of Patent: Jun. 6, 1995

[54] PNEUMATIC TIRES

[75] Inventor: Yasuo Himuro, Tokyo, Japan

[73] Assignee: Bridgestone Corporation, Tokyo, Japan

[21] Appl. No.: 245,907

[22] Filed: May 19, 1994

[30] Foreign Application Priority Data

May 20, 1993 [JP] Japan .................................. 5-118218
Oct. 20, 1993 [JP] Japan .................................. 5-262469

[51] Int. Cl.⁶ .......................................... B60C 11/03
[52] U.S. Cl. ............................... 152/209 R; D12/146
[58] Field of Search .................. 152/209 R; D12/136, D12/141, 145, 146

[56] References Cited

U.S. PATENT DOCUMENTS

| 4,633,926 | 1/1987 | Tamura | 152/209 R |
| 4,726,407 | 2/1988 | Hayakawa et al. | 152/209 R |
| 5,131,443 | 7/1992 | Kuhr et al. | 152/209 R |
| 5,154,783 | 10/1992 | Kuhr et al. | 152/209 R |
| 5,234,042 | 8/1993 | Kuhr et al. | 152/209 R |

FOREIGN PATENT DOCUMENTS

| 0064934 | 11/1982 | European Pat. Off. . | |
| 0428472 | 5/1991 | European Pat. Off. . | |
| 3707953 | 10/1987 | Germany . | |
| 9002986 | 5/1991 | Germany . | |
| 419203 | 1/1992 | Japan | B60C 11/04 |
| 478604 | 3/1992 | Japan | B60C 11/08 |
| 4193608 | 7/1992 | Japan | B60C 11/04 |
| 4218410 | 8/1992 | Japan | B60C 11/08 |
| 4224403 | 8/1992 | Japan | B60C 11/04 |
| 4230405 | 8/1992 | Japan | B60C 11/08 |
| 2224472 | 5/1990 | United Kingdom | B60C 11/04 |
| 2239845 | 7/1991 | United Kingdom | B60C 11/03 |

OTHER PUBLICATIONS

Database WPI, Week 9336, Derwent Publications Ltd., London, GB.
Patent Abstracts of Japan, vol. 11, No. 392 (M-653) 22 Dec. 1987.

Primary Examiner—Michael W. Ball
Assistant Examiner—Francis J. Lorin
Attorney, Agent, or Firm—Sughrue, Mion, Zinn, Macpeak & Seas

[57] ABSTRACT

There is provided a pneumatic tire having slant main grooves extending from positions adjacent to a circumferential rib in a tread center zone toward each tread end in opposite directions to each other at a relatively small angle with respect to the circumferential direction of the tire. Each of the slant grooves extends at an angle of not more than 40° to the circumferential direction of the tire, and slant auxiliary grooves are formed so as to extend at an angle of not less than 50° with respect to the circumferential direction of the tire from the ends of the slant main grooves to the tread end in each of tread side zones, and further the negative ratio of the tread is maximized at the portion adjacent to the circumferential rib and tends to be decreased towards the tread ends.

By means of this invention the wet property is enhanced and the pattern noise is reduced without adversely affecting the primary functions of the tire.

10 Claims, 7 Drawing Sheets

PNEUMATIC TIRES

BACKGROUND OF THE INVENTION

1. Field of the Invention

The present invention relates to pneumatic tires, and in particular to high-performance pneumatic tires which are capable of enhancing wet performance and reducing pattern noise compatibly without adversely affecting the primary properties of the tire.

2. Description of the Prior Art

In order to improve wet property and reduce pattern noise, for example, it is generally known to select a tread pattern having a combination of straight circumferential grooves and directional (uni-directional) slant grooves. In this case, it is effective to increase the negative ratio, which is the ratio of total groove area to the sum of total groove area and total land area.

However, since a conventional pattern comprising a combination of straight circumferential grooves and slant grooves has large circumferential groove portions and small slant groove portions, problem exists in that the appropriate distribution of grooves across the tread in the widthwise direction of the tire is not obtained and hence drainage efficiency is not effectively enhanced. Further when the negative ratio is increased to enhance the wet property, the land area is small and the necessary land rigidity is not retained, resulting in other problems of decreasing resistance to wear and cornering property, in addition to degrading pattern noise.

The present invention has been accomplished based on the realization that directional slant grooves having a small slant angle with respect to the circumferential direction of the tire is advantageous with respect to wet property, while when only these slant grooves are arranged, it is difficult to retain sufficient land rigidity resulting in degraded steering stability and the effect on reducing noise by pitch-variation is small because of the decreased number of pitches.

The objects of the present invention are to provide a pneumatic tire having enhanced wet property and effectively reduced pattern noise without degrading primary functions such as steering stability and resistance to wear by selecting the position and angle of such slant grooves, combining other slant grooves having selected position, angle and width with these slant grooves, and defining the distribution of the negative ratio across the tread in the widthwise direction of the tread.

SUMMARY OF THE INVENTION

According to the invention, there is provided a pneumatic tire having a tread pattern comprising a circumferential rib extending continuously in the circumferential direction of the tire in a tread center zone, defined by having a width of the tread width divided into half and extending on both sides of the equatorial plane of the tire as the middle plane, and slant main grooves extending from positions adjacent to the circumferential rib toward each tread end in opposite directions to each other at a relatively small angle with respect to the circumferential direction of the tire, characterized in that each of said slant grooves extends at an angle of not more than 40° with respect to the circumferential direction of the tire into a tread side zone defined between the tread center zone and the tread end, in that slant auxiliary grooves having relatively narrow width and extending at an angle of not less than 50° with respect to the circumferential direction of the tire and opening to the tread end are formed in each tread side zone, and said slant auxiliary grooves extending at least in one tread side zone are connected with the ends or near end portions of the tread end sides of the slant main grooves reaching the tread side zone, and in that the negative ratio of the tread is maximized at the portion adjacent to said circumferential rib and tends to be decreased towards the tread ends.

In this invention, the circumferential rib can be arranged in the center in the center zone or arranged to be at one side in the center zone. It is possible not only that the slant auxiliary grooves in only one tread side zone are connected with the ends or near end portions of the slant main grooves reaching the tread side zone but also that the slant auxiliary grooves in both of the tread side zones are connected with the slant main grooves.

It is normal in high performance tires to provide directional slant grooves and to make the negative ratio of the entire tread 25-35% in order to obtain sufficient wet property, and such features can be applied to the tire according to present invention.

Since in the tread contacting area water flows forward at an angle of 0°-20° with respect to the circumferential direction of the tire near the equatorial plane of the tire, and forward at an angle of 20°-40° near the border of the tread center zone and the tread side zone, and sideways at an angle of more than 40° in the remaining portion of the tread side zone, the tire of the present invention is provided with excellent drainage property forward in the circumferential direction by forming slant main grooves extending at relatively small angle of not more than 40° with respect to the circumferential direction of the tire and having sufficient groove volume in place of conventional circumferential straight grooves.

Sufficient wet property during straight running is preferably obtained by providing at least one slant groove passing through the tread contacting print.

Moreover, in order to ensure wet property during cornering and to reduce passing noise by making each frequency of air column resonance caused in each of the slant grooves different from one another, it is preferable to form slant auxiliary grooves, each of which has relatively narrow width, extending at a large angle of not less than 50° with respect to the circumferential direction of the tire and connecting with the slant main grooves in at least one tread side zone, with shorter pitch than the length of contacting print.

Further, since the slant main grooves here slantingly extend at a small angle with respect to the circumferential direction of the tire, the impulse of the land portion during tire rotation is small, and accordingly the slant main grooves do not produce an adverse effect on pattern noise.

According to the observation that a water layer arises in the center zone of the tread, the negative ratio produced by the slant main grooves formed in the tread center zone and the side zone is made much larger than that of the entire tread resulting in ensuring enhanced wet drainage property, and the negative ratio is maximized at both the side portions adjacent to the circumferential rib and tends to be gradually decreased towards the tread end.

It is preferable with respect to wet drainage property that the negative ratio of the edge portion in the tread center-side region which is defined as that where the slant main grooves exist and where the negative ratio is not less than 70% of the negative ratio of the whole tread, is made 50-80% of the maximum negative ratio of the portion adjacent to the circumferential rib. Moreover, it is preferable that the negative ratio of the tread end-side region outside the tread center-side region is made 15-30% of the maximum negative ratio in order to ensure tread rigidity because the tread end-side region outside the tread center-side region contributes largely for steering stability rather than for drainage property.

Furthermore, in the tread center-side region having width $W_0$ and where the slant main grooves exist, it is preferable for retaining good wet property that the negative ratio owing to the slant main grooves is more than 80% of the negative ratio of the whole tread, and it is preferable for retaining steering stability near marginal cornering ability and reducing the pattern noise that the width $W_0$ of the tread center-side region where the slant main grooves exist is not more than 85% of the tread width W.

When the angle of the slant main grooves is more than 40°, it is difficult to ensure the compatibility of sufficient negative ratio and block rigidity; it is preferable to make this angle smoothly larger going from the equatorial plane of the tire toward the tread end in order to enhance wet drainage property and steering stability.

Furthermore, when the angle of the slant auxiliary grooves is less than 50°, it is difficult to ensure block rigidity by which sufficient steering stability is obtained. In this connection, in order to enhance steering stability it is preferable that this slant angle is substantially 90°, whereby pattern noise can also be reduced in connection with the shape of the tread contacting print of the tire.

In order to ensure steering stability during straight running and good response for handling, the circumferential rib continuously extending in the circumferential direction of the tire is arranged in the tread center zone. In addition, this circumferential rib contributes to reducing pattern noise effectively because of its continuity.

Furthermore, in order to enhance particularly marginal cornering property among steering stability property, shoulder land rigidity is increased and tread contacting area is enlarged by making the negative ratio of the tread side zone small.

When the circumferential rib is arranged in the center portion in the center zone, impact which occurs in the center portion during rotation and has a large effect on pattern noise is reduced, so that the noise is reduced more effectively.

In the case of applying this circumferential rib to a high performance vehicle tire the width of which is wide in a front tire and narrow in a rear tire, the rigidity of the tread center portion during driving at small steering angle is enhanced because the circumferential rigidity of the tread center portion of the front tire, which has relatively narrow tread width, is enlarged.

On the other hand, when this circumferential rib is arranged to be one-sided in the tread center zone, in a rear tire which has relatively wide tread width, stable cornering with enhanced rigidity is possible because the circumferential rib shifts to near the center portion in the shifted contacting print during cornering.

Furthermore, when each of the slant auxiliary grooves in each of the tread side zones is connected with the slant main grooves, the ability to drain water sideways during cornering is enhanced, whereby resistance to hydro-planing during cornering is enhanced.

BRIEF DESCRIPTION OF THE DRAWINGS

Throughout the drawings, like reference numerals indicate like parts.

DESCRIPTION OF THE PREFERRED EMBODIMENTS

Figure 1:
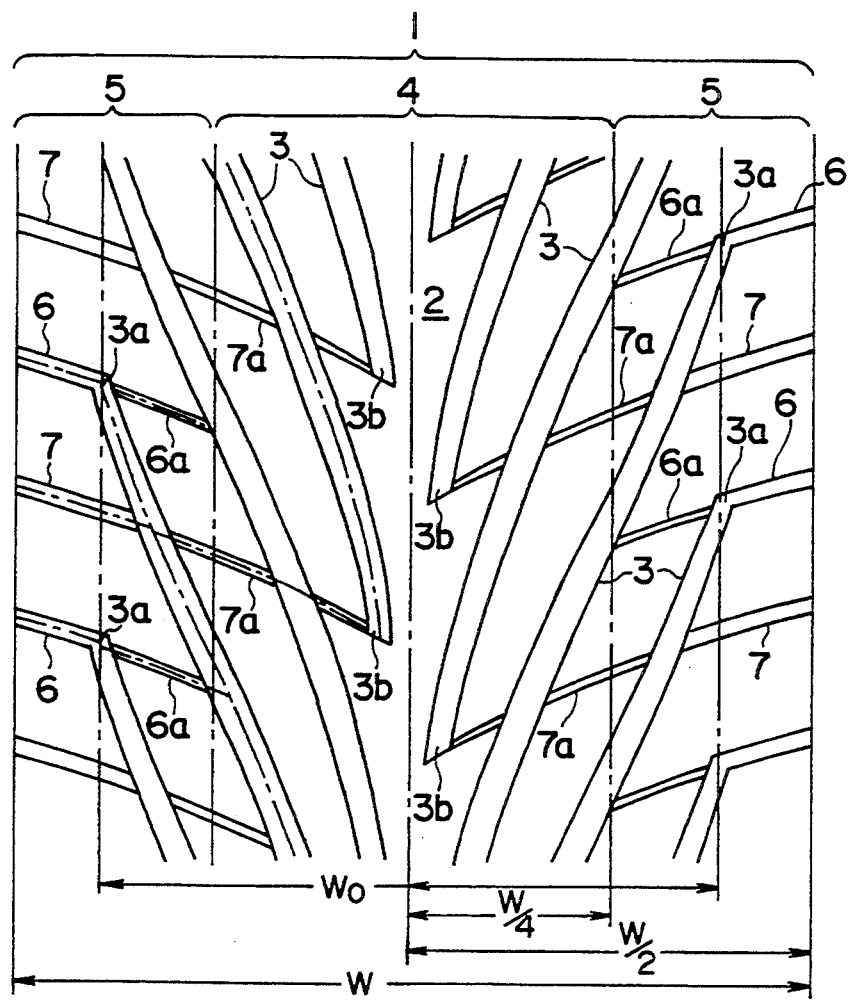
FIG. 1 is a schematic view of an embodiment of the tread pattern of a tire according to the invention.

FIG. 1 shows a first embodiment of the tread pattern of a tire according to the invention.

The basic structure of a pneumatic tire to which a tread pattern of the invention is applied is that a pair of sidewall portions and a crown portion connecting these sidewall portions to each other are reinforced with a radial carcass comprising a ply of cords wound around a bead core embedded in the bead portion along the inner edge of each sidewall, and a tread arranged along the crown portion is reinforced by a belt comprising a plurality of crossing layers of parallel arranged cords crossing at a small angle with respect to the circumferential direction around the crown portion. In FIG. 1, reference numeral 1 is the tread, 2 is a circumferential rib arranged on the equatorial plane and continuously extending in the circumferential direction of the tire, and 3 is slant main grooves. Further, numeral 4 shows a tread center zone defined by having a half width of the tread width and extending on both sides of the equatorial plane of the tire as the middle plane, and 5 are tread side zones defined between the tread center zone 4 and the tread ends.

Slant main grooves 3 extending slantwise at an angle of not more than 40° in opposite directions to each other with respect to the circumferential direction are formed alternately from positions adjacent to the circumferential rib 2 in the center portion in the tread center zone 4 toward each tread end. Each of the slant main grooves 3 extends continuously to be convex toward the tread center in the tread center zone 4 and be concave toward the tread center in the tread side zone 5, and ceases at the near tread center portion in the tread side zone 5.

Further, in the tread side zone 5, slant auxiliary grooves 6 having a relatively narrower width than the slant main grooves 3 extend in the same direction as the slant main grooves 3 at an angle of not less than 50°, at a relatively large angle of 50°–80° in this embodiment, and connect with the tread end-side ends 3a of the slant grooves 3, and intermediate grooves 7 extending in parallel with the slant auxiliary grooves 6 and connecting with intermediate portions of the slant main grooves 3 are formed so as to divide each intermediate portion between the slant auxiliary grooves 6. Here, an extended narrow portion 6a having a narrower width than the slant auxiliary groove 6 can be connected with the slant auxiliary groove 6 so as to reach another slant main groove 3 inside the slant main groove 3 with which this slant auxiliary groove 6 connects, and an extended narrow portion 7a having a narrower width than the intermediate groove 7 can be connected with the intermediate groove 7 so as to cross the inner slant main groove 3 adjacent to the intermediate groove 7 and reach the tread center-side end 3b of the further inner slant main groove 3.

With regard to the above description, it is preferable that the slant angle of the slant main grooves 3 is 5°–20°. When the slant main grooves 3 have a winding configuration as shown in FIG. 1, the average slant angle is measured by averaging the angle of each tangent at the point which equally divides the length of each of convex and concave curve lines positioned at each side of the inflection point.

Each average width of each groove is narrower in the order of the slant main groove 3, the slant auxiliary groove 6, the intermediate groove 7, and each extended narrow portion 6a, 7a. Particularly, that of the slant main groove 3 is 2–5% of the tread width W, those of the slant auxiliary groove 6 and the intermediate groove 7 are each 20–50% of the maximum width of the slant main groove and have a lower limit of 2 mm to avoid closing when coming in contact with the road during rotating. Those of the narrow extended portions 6a, 7a are each 0.2–2 mm.

Each average depth of the slant auxiliary grooves 6 and the intermediate grooves 7 is shallower than each average depth of the slant main grooves 3, and each average depth of the extended narrow portions 6a, 7a is equal to or shallower than each average depth of the slant auxiliary grooves 6 and intermediate grooves 7.

Figure 2:
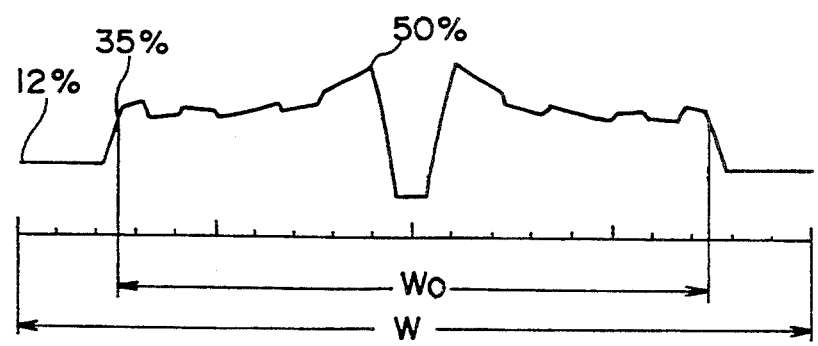
FIG. 2 is a graph showing the distribution of the negative ratio in the widthwise direction of the tire shown in FIG. 1.

In this tire in which the land portion is divided under above mentioned groove arrangement, the negative ratio of the entire tread is 25–35% and, as shown in the graph of FIG. 2, the negative ratio at each position in the widthwise direction across the tread is maximized at the portion adjacent to the circumferential rib 2 and tends to be decreased towards the tread ends. More preferably, the negative ratio of the edge portion in the tread center-side region, where the slant main grooves exist and the negative ratio is not less than 70% of the negative ratio of the entire tread and which has the width of, for example, 70–90% of the tread width, is made 50–80% of the maximum negative ratio, and further the negative ratio of the tread end-side region outside the tread center-side region is made 15–30% of the maximum negative ratio.

A tire having the arrangement, as mentioned above, has both enhanced wet property and reduced pattern noise without degrading steering stability and other primary functions of the tire.

Each of the narrow extended portions 6a, 7a has functions to enhance gripping the road surface and produce an edge effect on a slippery road such as a snow, ice or wet road. The intermediate grooves 7 produce twice as many pitches as the slant main grooves 3 in the tread shoulder portion in cooperation with the slant auxiliary grooves 6 resulting in greatly enhanced drainage property during cornering and effective reduction of pattern noise.

This is especially effective when each average width of the slant auxiliary grooves 6 and the intermediate grooves 7 is 20–50% of the maximum width of the slant main grooves 3.

Figure 3:
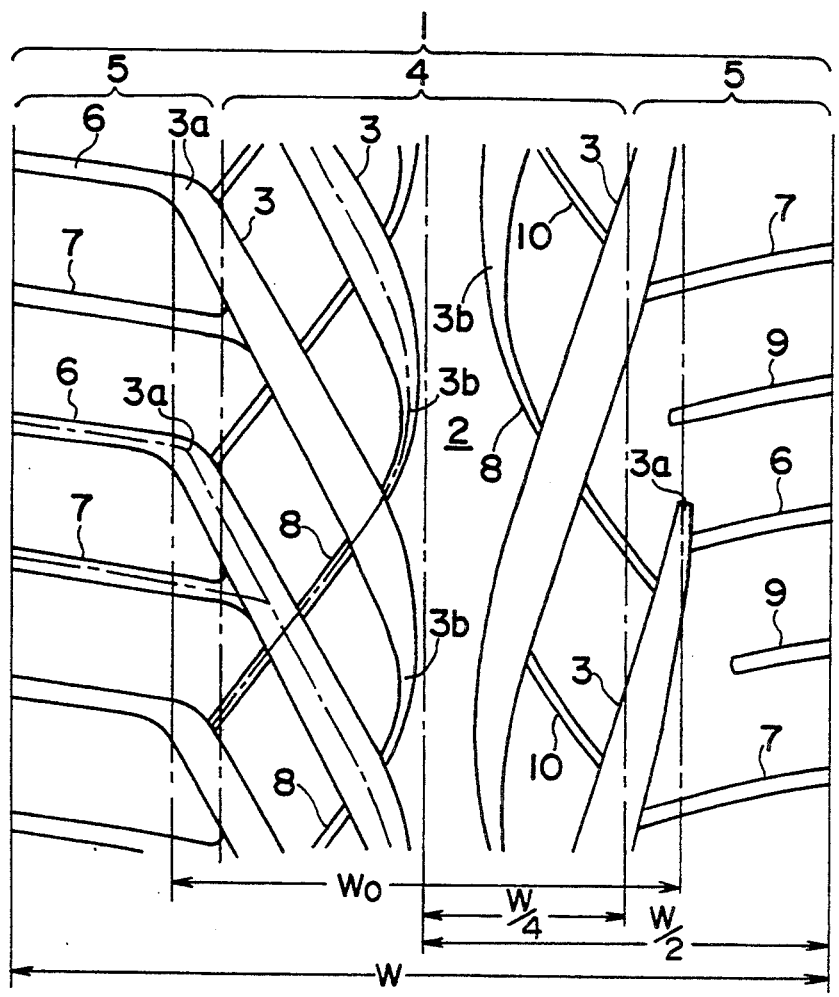
FIG. 3 is a schematic view of another embodiment of the tread pattern of a tire according to the invention.

FIG. 3 illustrate another embodiment of the tread pattern according to the invention.

In this embodiment, the circumferential rib 2 is arranged on the right side in the tread center zone 4, in other words arranged to slightly to one-side toward the outer side of the tire viewing the tire mounted onto a vehicle. Intervals of slant main grooves 3 extending from positions adjacent to the circumferential rib are made relatively a little larger in the outer portion of the tire viewing the tire mounted onto the vehicle than in the inner portion. Each slant angle of the slant main grooves 3 with respect to the circumferential direction of the tire is smaller in the outer portion than in the inner portion.

In the inner portion of the tire, viewing the tire mounted onto the vehicle, both slant auxiliary grooves 6 connected with the tread end-side ends 3a of the slant main grooves 3 and intermediate grooves 7 connected with the intermediate portions of the slant main grooves 3 cease at the slant main grooves without having narrow extended portions. Further, each slant angle of the slant main grooves 3 is smaller near the tread center-side end 3b and its width is also smaller in this portion 3b, and narrow grooves 8 extending in the opposite direction with respect to the direction of the slant main grooves 3 from the end 3b are formed so as to extend toward the tread end. These narrow grooves 8 cross two slant main grooves 3 and cease by connecting with a third slant main groove 3 near the tread end-side end 3a.

On the other hand, in the outer portion of the tire, the slant auxiliary grooves 6 are connected with the slant main grooves 3 near the tread end-side end 3a, and subsidiary slant grooves 9 are formed between the slant auxiliary grooves 6 and the intermediate grooves 7 so as to extend in parallel with the slant auxiliary grooves 6 and the intermediate grooves 7 and divide intermediate portions between these grooves equally, and each of subsidiary slant grooves 9 is opened to the tread end but ceases without connecting with the slant main grooves 3. Further, the slant angle and the width of the slant main grooves 3 are both made smaller near the tread center-side ends 3b of the slant main grooves 3 in the same way as i n the inner portion, and narrow grooves 8 extending in the opposite direction to the slant main grooves 3 are formed from the end 3b, wherein the narrow grooves 8 cross one slant main groove 3 and cease by connecting with a second slant main groove 3 near the end 3a. Furthermore, subsidiary narrow grooves 10 are formed between adjacent slant main grooves 3 to extend in parallel with the narrow grooves 8, divide the intermediate portions between adjacent narrow grooves 8 equally and connect with both of the adjacent slant main grooves 3.

In this embodiment, each average width of each groove is narrower in the order of the slant main groove 3, the group of the slant auxiliary groove 6, the intermediate groove 7 and the subsidiary slant groove 9, and the group of the narrow groove 8 and the subsidiary narrow groove 10. In particular that of the slant main groove 3 is 2-5% of the tread width W; those of the slant auxiliary groove 6, the intermediate groove 7 and the subsidiary slant groove 9 are each 20-50% of the maximum width of the slant main groove 3 and have lower limit of 2 mm to avoid closing when coming in contact with the road during rotating; and those of the narrow groove 8 and the subsidiary narrow groove 10 are each 0.2-2 mm.

Each average depth of the slant auxiliary grooves the intermediate grooves 7 and the subsidiary grooves 9 is shallower than each average depth of the slant main grooves 3, and each average depth of the narrow grooves 8 and the subsidiary narrow grooves 10 is equal to or shallower than each average depth of the slant auxiliary grooves 6, intermediate grooves 7 and subsidiary slant grooves 9.

Figure 4:
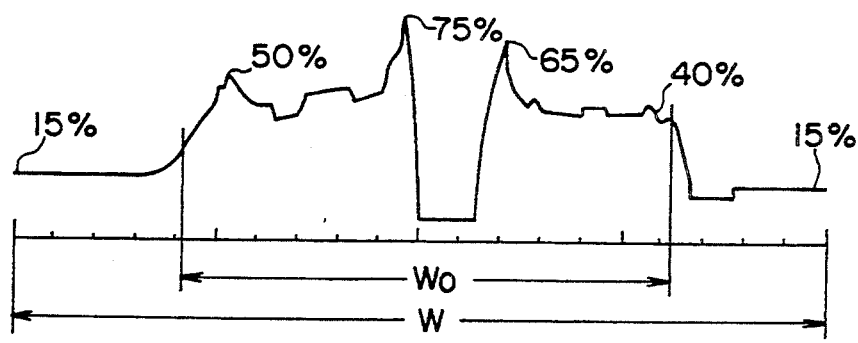
FIG. 4 is a graph showing the distribution of the negative ratio in the widthwise direction of the tire shown in FIG. 3.

Under such groove arrangement, as shown in the graph of FIG. 4, the negative ratio at each portion across the tread in the widthwise direction is maximized at the portion adjacent to the circumferential rib 2 and tends to be decreased towards the tread ends.

The tire above mentioned with reference to FIGS. 3 and 4 has substantially the same effect as the tire of first embodiment of FIGS. 1 and 2 with regard to the wet property and the pattern noise based on the particular arrangement of the slant main grooves 3 and the slant auxiliary grooves 6, and the selection of the negative ratio of each point in the widthwise direction.

In this embodiment, the narrow grooves 8 and the subsidiary narrow grooves 10 both extending in the opposite direction to the direction of the slant main grooves 3 ensure the tread gripping ability and bring about the edge effect on a slippery road such as a wet road.

Further, the subsidiary slant grooves 9, in cooperation with the slant auxiliary grooves 6 and the intermediate grooves 7, enhance the gripping ability without degrading the block rigidity in the shoulder portion, enhance the drainage property and the edge effect during cornering, and reduce pattern noise in the same way as the intermediate grooves 7 in the first embodiment.

In the tire of this embodiment, the circumferential rib 2 can be arranged in the center portion in the tread center zone.

Comparative Test 1

A comparative test between tires of the invention and a conventional tire will be described with respect to the wet drainage property, the pattern noise and the steering stability on dry road.

Test Tires

The test tires have a size of 225/50 R16, a tread width of 200 mm and a tread contact length of 120 mm.

Invention Tire 1

This tire has a tread pattern as shown in FIG. 1, in which the negative ratio of the entire tread is 28%, the negative ratio at each portion in the widthwise direction is distributed as shown in FIG. 2, and the width, the depth and the angle with respect to the circumferential direction of the tire are shown in Table 1.

TABLE 1

|  | Width (mm) | Slant angle | Depth (mm) |
| --- | --- | --- | --- |
| Slant main groove | 6-8-5 | 10-20-10° | 8 |

TABLE 1-continued

|  | Width (mm) | Slant angle | Depth (mm) |
| --- | --- | --- | --- |
| Slant auxiliary groove and intermediate groove | 4 | 70° | 6.5 |
| Narrow extended portion | 2 | 60-70° | 6.5 |

Invention Tire 2

This tire has an asymmetrical tread pattern as shown in FIG. 3, in which the negative ratio of the entire tread is 29%, the negative ratio at each portion in the widthwise direction is distributed as shown in FIG. 4, and the width, the depth and the angle with respect to the circumferential direction of the tire are shown in Table 2.

TABLE 2

|  | Width (mm) | Slant angle | Depth (mm) |
| --- | --- | --- | --- |
| Right slant main groove | 2-15-5 | 0-20-10° | 8 |
| Left slant main groove | 2-13-10 | 0-25° | 8 |
| Right slant auxiliary groove, intermediate groove and subsidiary slant groove | 4 | 75° | 6.5 |
| Left slant auxiliary groove and subsidiary slant groove | 5 | 85° | 6.5 |
| Right narrow groove and subsidiary narrow groove | 2 | 35° | 6.5 |
| Left narrow groove | 2 | 40° | 6.5 |

Conventional Tire

Figure 9A:
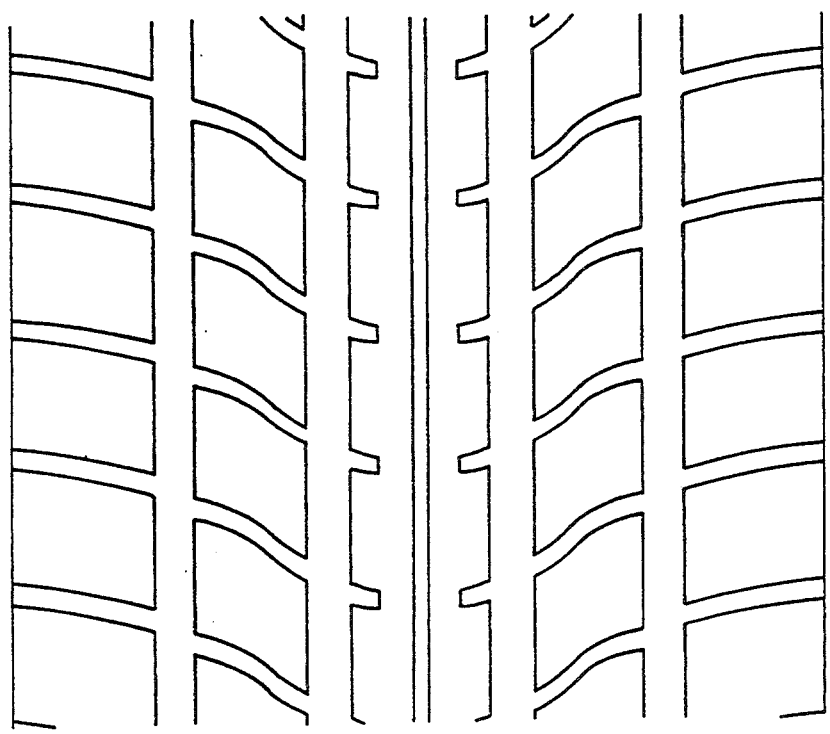
FIGS. 9a and 9b are respectively a schematic view of the tread pattern of a conventional tire and a graph showing the distribution of the negative ratio in the widthwise direction of the tire.
Figure 9B:
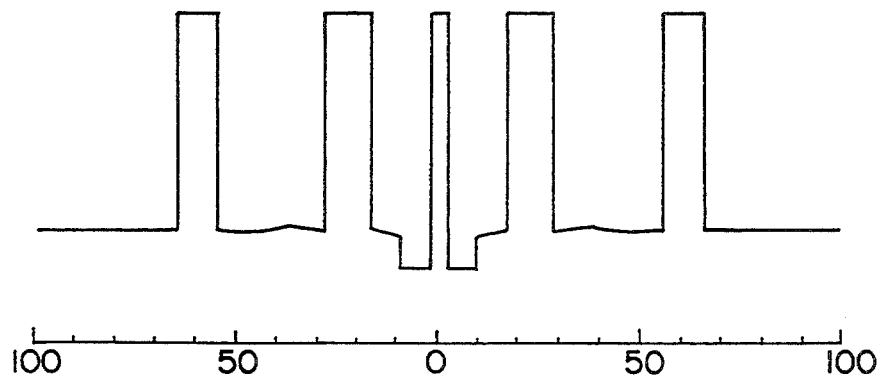

A tire as shown in FIG. 9.

Test Method

The test tire was inflated under an internal pressure of 2.3 kgf/cm$^2$ and mounted on a vehicle under loading with two passengers. The wet drainage property during straight running was evaluated by measuring a remaining area of the ground contacting area during passing on a wet road surface having a water depth of 5 mm at a speed of 80 km/hr and 90 km/hr. The wet drainage property during cornering was evaluated by measuring a marginal lateral gravity during passing on wet road having a water depth of 5 mm and a radius of 100 mm.

The pattern noise was evaluated by feel inside the vehicle during drifting from 100 km/hr on a straight smooth road.

The steering stability on dry road was evaluated by feeling during running on a dry circuit under various running modes.

Test results

The measured results are shown in Table 3, by an index value on the basis that the conventional tire is control.

TABLE 3

|  | Conventional tire | Invention tire 1 | Invention tire 2 |
| --- | --- | --- | --- |
| Wet drainage property during straight running | 100 | 125 | 120 |
| Wet drainage property during cornering | 100 | 120 | 115 |
| Pattern noise | 100 | 105 | 105 |
| Steering stability on dry road | 100 | 100 | 105 |

As seen from Table 3, the steering stability on dry road can be retained with high level, and enhancement of both the wet drainage property and reduction of the pattern noise can be effectively accomplished in each of the invention tires.

Figure 5:
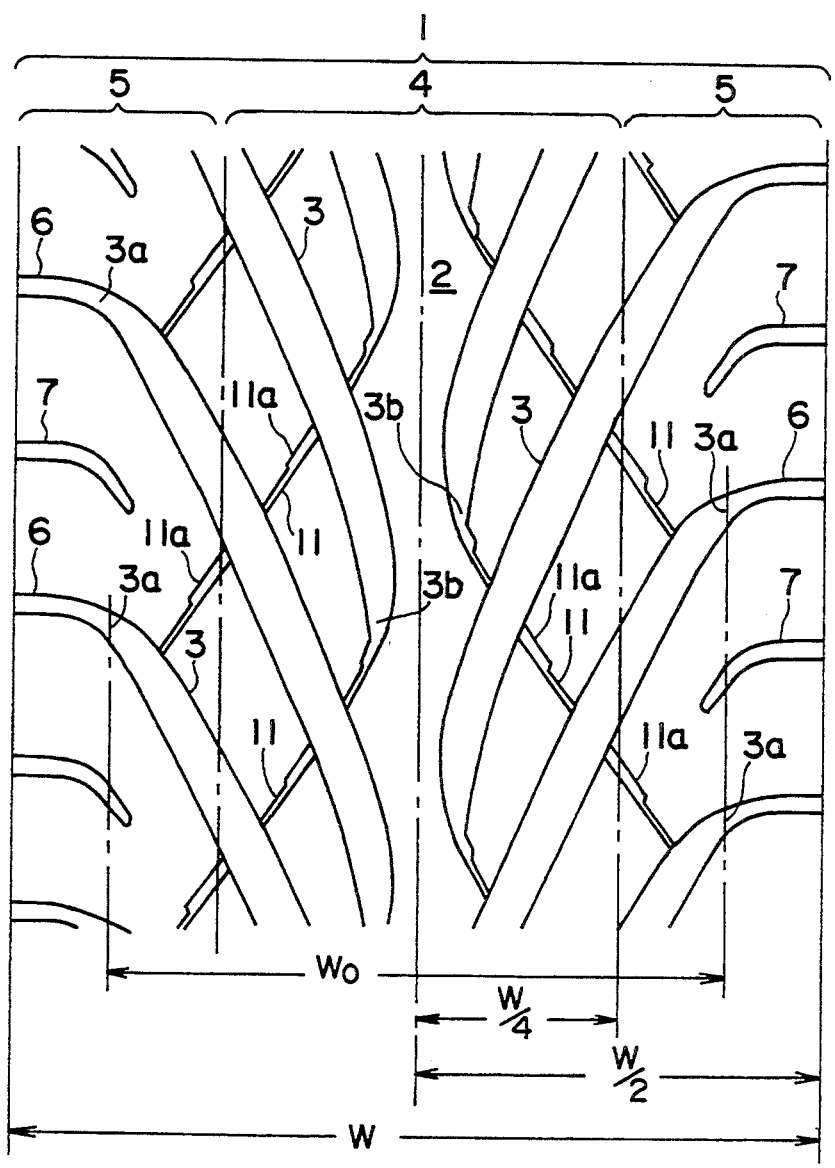
FIG. 5 is a schematic view of a further embodiment Of the tread pattern of a tire according to the invention.

FIG. 5 shows a further embodiment of the tread pattern according to the invention.

In this embodiment, a circumferential rib 2 is arranged in the center portion in the tread center zone 4, and slant main grooves 3 extending slantwise at an angle of not more than 40° in opposite directions to each other with respect to the circumferential direction are formed alternately from positions adjacent to the circumferential rib toward each tread end, and each of the slant main grooves 3 has narrower width near the tread end-side end 3a and the tread center-side end 3b than in the other portion. Here, in the tread center-side region having width $W_0$ and where the slant main grooves 3 exist, it is preferable for retaining good wet property that the negative ratio owing to the slant main grooves 3 is more than 80% of the negative ratio of the entire tread, and it is preferable for retaining steering stability near marginal cornering ability and for reducing the pattern noise that the width $W_0$ of the tread center-side region where the slant main grooves 3 exist is not more than 85% of the tread width W.

The narrow width of the slant main grooves near the end 3a produces high block rigidity and enhances drainage effect by hastening the speed of water drainage, and the narrow width of the slant main grooves near the end 3b enlarge the area and the rigidity of the circumferential rib 2.

Further, in the tread side zones 5, slant auxiliary grooves 6 connect with the tread end-side ends 3a of the slant grooves and extend curvedly with their convex upward as shown in the drawing from here to the tread end, and preferably the slant angle of these slant auxiliary grooves 6 is 70°–100° with respect to the circumferential direction of the tire. Also, intermediate grooves 7 are formed so as to extend in parallel with the slant auxiliary grooves 6 and divide each intermediate portion between the slant auxiliary grooves 6, and these intermediate grooves 7 open to the tread end and cease without connecting to the slant main grooves 3 at the tread center-side. Here, it is preferable for effectively reducing the pattern noise, especially the pattern noise during cornering, and for retaining the wet drainage property during cornering, that each average width of the slant auxiliary grooves 6 and the intermediate grooves 7 is 20–50% of the maximum width of the slant main grooves.

Furthermore, as mentioned with respect to FIG. 3, the slant angle of the slant main grooves 3 is made smaller near the tread center-side end 3b of the slant main grooves, and narrow grooves 11 are formed so as to extend in the opposite direction to the slant main grooves 3 from the ends 3b toward the tread end, wherein each of the narrow grooves 11 crosses two slant main grooves and ceases by connecting with a third slant main groove 3 near the tread end-side end 3a. The narrow grooves 11 have slightly wider portions 11a to obtain large edge effect in the portions near the slant main grooves 3 and have narrower width in the remaining portions where the groove walls almost touch each other on contacting the road during the running of the loaded tire. Such narrow grooves 11 bring enhanced gripping road ability and edge effect to a slippery road. Moreover, since the narrow grooves 11 extend in the opposite direction to the slant main grooves 3, damage to the groove edge can be effectively prevented.

Figure 6:
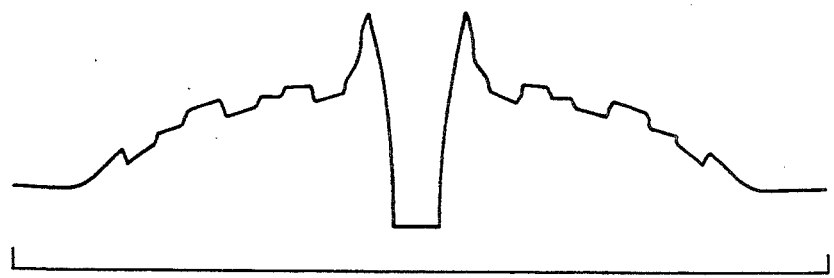
FIG. 6 is a graph showing the distribution of the negative ratio in the widthwise direction of the tire shown in FIG. 5.

Under above mentioned groove arrangement, as shown in the graph of FIG. 6, the negative ratio at each position across the tread in the widthwise direction is maximized at the portion adjacent to the circumferential rib 2 and tends to be decreased towards the tread ends.

In this tire also, as in each of the above mentioned embodiments, there is accomplished as enhancement of the wet property and a reduction of the pattern noise based on the position, the slant angle and the width of the slant main grooves 3 and the slant auxiliary grooves 6, and the negative ratio.

Figure 7:
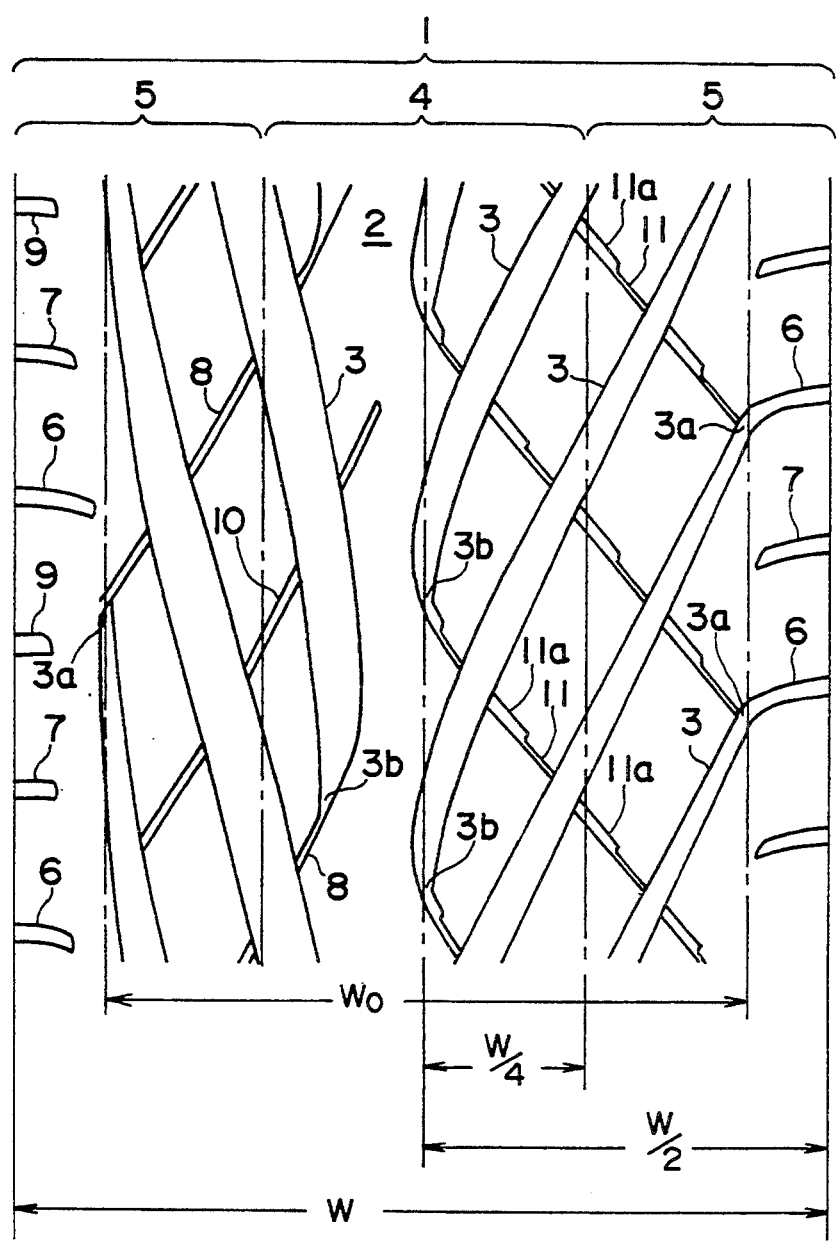
FIG. 7 is a schematic view of a yet further embodiment of the tread pattern of a tire according to the invention.

FIG. 7 shows a yet further embodiment of the tread pattern according to the invention, in which a circumferential rib 2 is arranged on the left side in the tread center zone 4, in other words arranged to be one sided toward the inner side of the tire viewing the tire when mounted on a vehicle. The average slant angle of each of the slant main grooves 3 extending from each position adjacent to the circumferential rib 2 is made smaller in the inner portion of the tire viewing the tire mounted on the vehicle than in the outer portion, and the width is made a little larger and arranged pitches are made larger in the inner portion.

Here, in the outer portion of the tire viewing the tire when mounted on a vehicle, slant auxiliary grooves 6, as mentioned with regard to FIG. 5, are formed so as to connect with the ends 3a of the slant main grooves having gradually decreased width toward the tread end, and intermediate grooves 7, as above mentioned, are formed without connecting with the slant main grooves 3. Further, narrow grooves 11, as mentioned with regard to FIG. 5, are formed from the ends 3b of the slant main grooves 3, wherein each of the narrow grooves 11 crosses three slant main grooves and ceases by connecting with a fourth slant main groove 3 near the end 3a.

On the other hand, in the inner portion viewing the tire when mounted on a vehicle, narrow grooves 8, as mentioned with regard to FIG. 3, are formed so as to connect with the tread center-side ends 3b of the slant main grooves 3, wherein each of the narrow grooves 8 crosses two slant main grooves 3 and ceases at the end 3a of a third slant main groove 3. Further, subsidiary narrow grooves 10, as mentioned with regard to FIG. 3, are formed between two narrow grooves 8 to extend in parallel with the narrow grooves 8 and divide the intermediate portion between the narrow grooves 8 equally, and the tread end-side ends of the subsidiary narrow grooves 10 open to the intermediate portion of the slant main grooves 3 and the tread center-side ends of the subsidiary narrow grooves 10 enter into the circumferential rib 2.

In this inner portion, slant auxiliary grooves 6, intermediate grooves 7 and subsidiary slant grooves 9 are formed substantially in parallel with one another and substantially at equal intervals, and one end of each of these grooves opens to the tread end and the other end ceases without connecting with the slant main grooves 3. In this connection, though the tread end-side ends 3a of the slant main grooves 3 cease without connecting with the slant auxiliary grooves 6, the slant main grooves 3 in the inner side go through the contact print from front to behind at a small slant angle during general running of a vehicle and bring about sufficiently effective drainage property.

Figure 8:
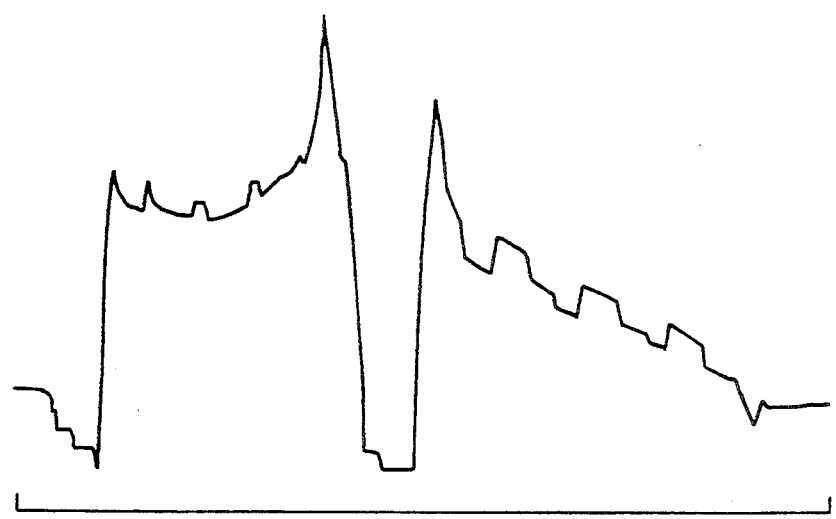
FIG. 8 is a graph showing the distribution of the negative ratio in the widthwise direction of the tire shown in FIG. 7.

FIG. 8 shows the distribution of the negative ratio of the tire having this tread pattern, wherein the negative ratio at each position is also maximized at the portion adjacent to the circumferential rib 2 and also tends to be decreased towards the tread ends.

Accordingly, this tire can bring about the same effect as each of the above mentioned embodiments.

In this embodiment also, the circumferential rib 2 can be arranged in the center portion in the tread center zone 4.

Also in these third and fourth embodiments, each average width of each groove is narrower in the order of the slant main groove 3, the group of the slant auxiliary groove 6, the intermediate groove 7 and the subsidiary slant groove 9, and the group of the narrow groove 11 and subsidiary narrow groove 10. In particular, the average width of the slant main groove 3 is 2-5% of the tread width W; the average widths of the slant auxiliary groove 6, the intermediate groove 7 and the subsidiary slant groove 9 are each 20-50% of the maximum width of the slant main groove and have a lower limit of 2 mm to avoid closing when coming into contact with the road during rotation; and the average widths of the narrow groove 11 and subsidiary narrow groove 10 are each 0.2-2 mm.

The average depths of each of the slant auxiliary grooves 6, the intermediate grooves 7 and the subsidiary slant grooves 9 are shallower than that of the slant main grooves 3, and those of the narrow grooves 11 and the subsidiary narrow grooves 10 are equal to or shallower than those of the slant auxiliary grooves 6, intermediate grooves 7 and the subsidiary slant grooves 9.

Comparative Test 2

A comparative test between tires of the invention and a conventional tire will be described with respect to the wet drainage property, the pattern noise and the steering stability on dry road.

Test Tires

The test tires have a size of 225/50 R16, a tread width of 180 mm and a tread contact length of 120 mm.

Invention Tire 1

This tire has a tread pattern as shown in FIG. 5, in which the negative ratio of the whole tread is 29%, the width $W_0$ of the region where the slant main grooves extend is 140 mm, the ratio of the negative ratio of slant main grooves to the negative ratio of the whole tread is 85% and further this tire has dimensions as shown in Table 4.

TABLE 4

|  | Width (mm) | Slant angle | Depth (mm) |
| --- | --- | --- | --- |
| Slant main groove | 3-11-5 | 0-25-40° | 8 |
| Slant auxiliary groove and intermediate groove | 4.5 | 90° (Contact end portion) | 6.5 |
| Narrow groove (Extended width portion) | 1.0 (2.5) | 35° | 6.5 |

The number of pitches in the tread shoulder portion is 56 per one circuit.

Invention Tire 2

This tire has a tread pattern as shown in FIG. 7, in which the negative ratio of the whole tread is 29%, the width $W_0$ of the region where the slant main grooves extend is 145 mm, the ratio of the negative ratio of slant main grooves to the negative ratio of the whole tread is 83%, and further this tire has dimensions as shown in Table 5.

TABLE 5

|  | Width (mm) | Slant Angle | Depth (mm) |
| --- | --- | --- | --- |
| Right slant main groove | 3-11-5 | 0-20-25° | 8 |
| Left slant main groove | 3-14-4 | 0-10-5° | 8 |
| Slant auxiliary groove and intermediate groove | 4.0 | 90° (Contact end portion) | 6.5 |
| Subsidiary slant groove | 4.5 | 90° (Contact end portion) | 6.5 |
| Narrow groove | 1.0 (2.5) | 40° | 6.5 |
| Subsidiary narrow groove | 2.0 | 30° | 6.5 |

The number of pitches in the left tread shoulder portion is 60 per one circuit.

Conventional Tire

A tire as shown in FIG. 9.

Test Results

The measured results of the wet drainage property respectively during straight running and during cornering, the pattern noise and the steering stability on dry road, measured by the same method as in the comparative test 1, are shown in Table 6 by index value.

The index value is on the basis that the conventional tire is control, and the larger the index value, the better the results.

TABLE 6

|  | Conventional tire | Invention tire 1 | Invention tire 2 |
| --- | --- | --- | --- |
| Wet drainage property during straight running | 100 | 130 | 120 |
| Wet drainage property during cornering | 100 | 125 | 115 |
| Pattern noise | 100 | 110 | 105 |
| Steering stability on dry road | 100 | 105 | 110 |

According to this invention, as is apparent from the comparative tests, there is accomplished enhancement of the wet property and reduction of the pattern noise without degrading other primary properties by means of the structure and the formation of the slant main grooves and the slant auxiliary grooves and the negative ratio at each position in the widthwise direction.

While the invention has been particularly shown and described with reference to certain preferred embodiments thereof, it will be understood by those skilled in the art that various changes and modifications may be made without departing from the spirit and scope of the invention.

I claim:

1. A pneumatic tire having a tread pattern comprising; a circumferential rib extending continuously in the circumferential direction of the tire in a tread center zone, defined by having a width that is half of the tread width and extending on both sides of the equatorial plane of the tire slant main grooves extending from positions adjacent to the circumferential rib toward each tread side in opposite directions to each other at an angle of not more than 40° with respect to the circumferential direction of the tire into a tread side zone defined between the tread center zone and the tread end, slant auxiliary grooves having relatively narrow width and extending at an angle of not less than 50° with respect to the circumferential direction of the tire and opening to the tread end are formed in each tread side zone, said slant auxiliary grooves extending at least in one tread side zone are connected with the ends or near end portions of the tread end sides of the slant main grooves reaching the tread side zone, and wherein the negative ratio of the tread pattern is greatest at the portion adjacent to said circumferential rib and tends to be decreased towards the tread sides.

2. The pneumatic tire according to claim 1, wherein said circumferential rib is arranged in the center portion in the tread center zone.

3. The pneumatic tire according to claim 1, wherein said circumferential rib is arranged offset in the tread center zone.

4. The pneumatic tire according to claim 1, wherein each of said slant auxiliary grooves in each of the tread side zones is connected with the slant main grooves.

5. The pneumatic tire according to claim 1, wherein the negative ratio of a portion in a tread center-side region defined as that portion of said tread pattern where the slant main grooves exist is 50–80% of the maximum negative ratio of the tread portion adjacent to the circumferential rib.

6. The pneumatic tire according to claim 5, wherein the negative ratio of the tread center-side region is not less than 70% of the average overall negative ratio of the whole tread.

7. The pneumatic tire according to claim 5, wherein the tread center-side region has a width of 70–90% of the tread width.

8. The pneumatic tire according to claim 5, wherein the negative ratio of a tread end-side region axially outside the tread center-side region is 15–30% of the maximum negative ratio of the portion adjacent to the circumferential rib.

9. The pneumatic tire according to claim 5, wherein, in the tread center-side region, the average overall negative ratio owing to the slant main grooves is more than 80% of the negative ratio of the whole tread.

10. The pneumatic tire according to claim 5, wherein the width of the tread center-side region is not more than 85% of the tread width.

* * * * *